United States Patent [19]

Chien-Yeh Lee

[11] Patent Number: 5,193,109
[45] Date of Patent: Mar. 9, 1993

[54] ZONED MICROCELL WITH SECTOR SCANNING FOR CELLULAR TELEPHONE SYSTEM

[75] Inventor: William Chien-Yeh Lee, Corona Del Mar, Calif.

[73] Assignee: PacTel Corporation, Walnut Creek, Calif.

[21] Appl. No.: 784,667

[22] Filed: Oct. 25, 1991

[51] Int. Cl.$^5$ ............................................. H04M 11/00
[52] U.S. Cl. ....................................... 379/60; 379/59; 455/33.3
[58] Field of Search ..................... 379/58-60, 379/63; 455/33, 33.1-33.4, 34.1

[56] References Cited

U.S. PATENT DOCUMENTS

| | | | |
|---|---|---|---|
| 4,144,409 | 3/1979 | Utano et al. | 455/33 |
| 4,144,411 | 3/1979 | Frenkiel | 379/60 |
| 4,485,486 | 11/1984 | Webb et al. | 455/33 |
| 4,704,734 | 11/1987 | Mench et al. | 455/33 |
| 4,727,590 | 2/1988 | Kawano et al. | 455/33 |
| 4,759,051 | 7/1988 | Han | 379/59 |
| 4,771,448 | 9/1988 | Koohgoli et al. | 379/60 |
| 4,775,998 | 10/1988 | Felix et al. | 379/59 |
| 4,790,000 | 12/1988 | Kinoshita | 379/59 |
| 4,794,635 | 12/1988 | Hess | 379/60 |
| 4,799,253 | 1/1989 | Stern et al. | 379/59 |
| 5,067,147 | 11/1991 | Lee | 379/59 |

Primary Examiner—Curtis Kuntz
Assistant Examiner—Dwayne D. Bost
Attorney, Agent, or Firm—McCubbrey, Bartels, Meyer & Ward

[57] ABSTRACT

A zoned microcell system with sector scanning for cellular telephone systems has a plurality of contiguous cells, each having a different assigned set of transmission frequency channels, arranged with handoff means for maintaining continuous communication with mobile telephones moving from cell to cell. The system includes at least one cell having a plurality of transmitting and receiving antenna sets. Each set is positioned at a respective antenna sub-site within the periphery of the cell at a suitable location, and is configured so that propagation and reception of signals is limited to a transmission zone which is substantially within the boundaries of the cell and which is substantially less in area than the cell. Control means monitor the strength of the signal received by each of the antenna sets at each frequency channel in the assigned set. Transmission, at each frequency channel in the assigned set, is confined to the antenna set at one sub-site in the cell having the strongest received signal at each frequency to thus limit signal propagation to the transmission zone served by that set. In one embodiment, further signal strength monitoring is provided at each sub-site. Transmission, at each frequency channel in the assigned set, is confined to a specific sub-set of antennas at the sub-site. In this way, transmission at each frequency channel in the assigned set is confined to a limited sector within the transmission zone.

13 Claims, 4 Drawing Sheets

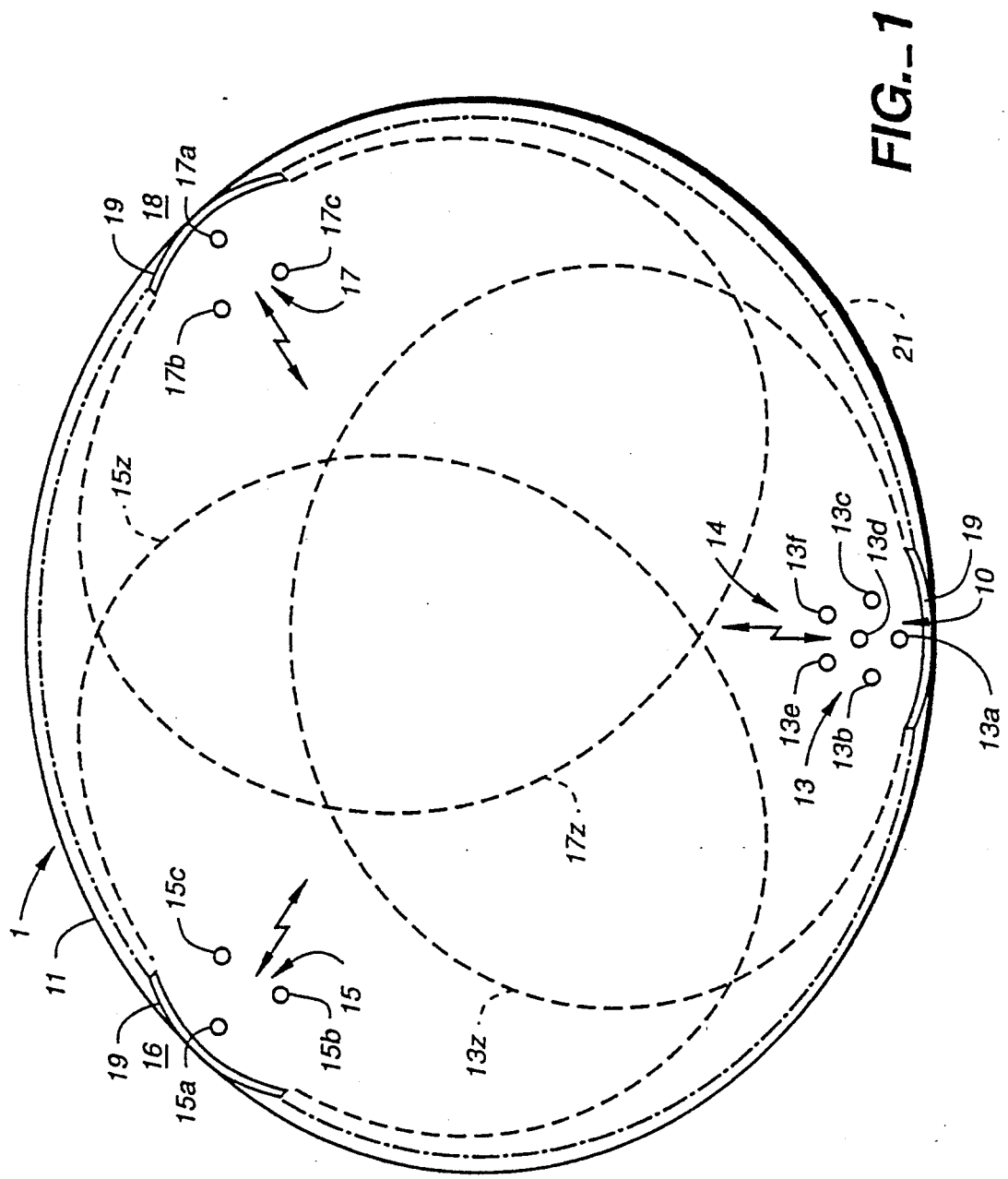
FIG._1

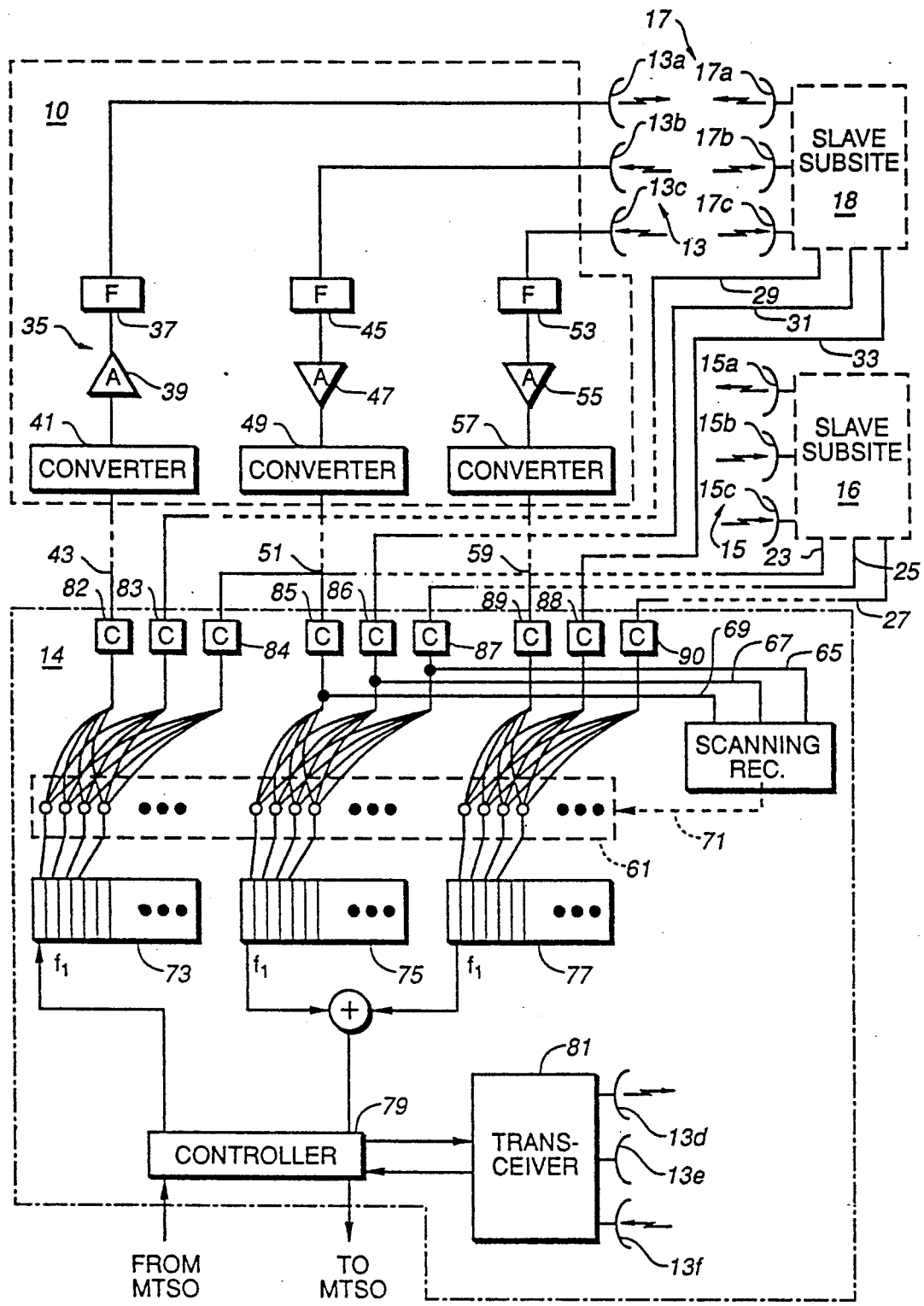
FIG._2

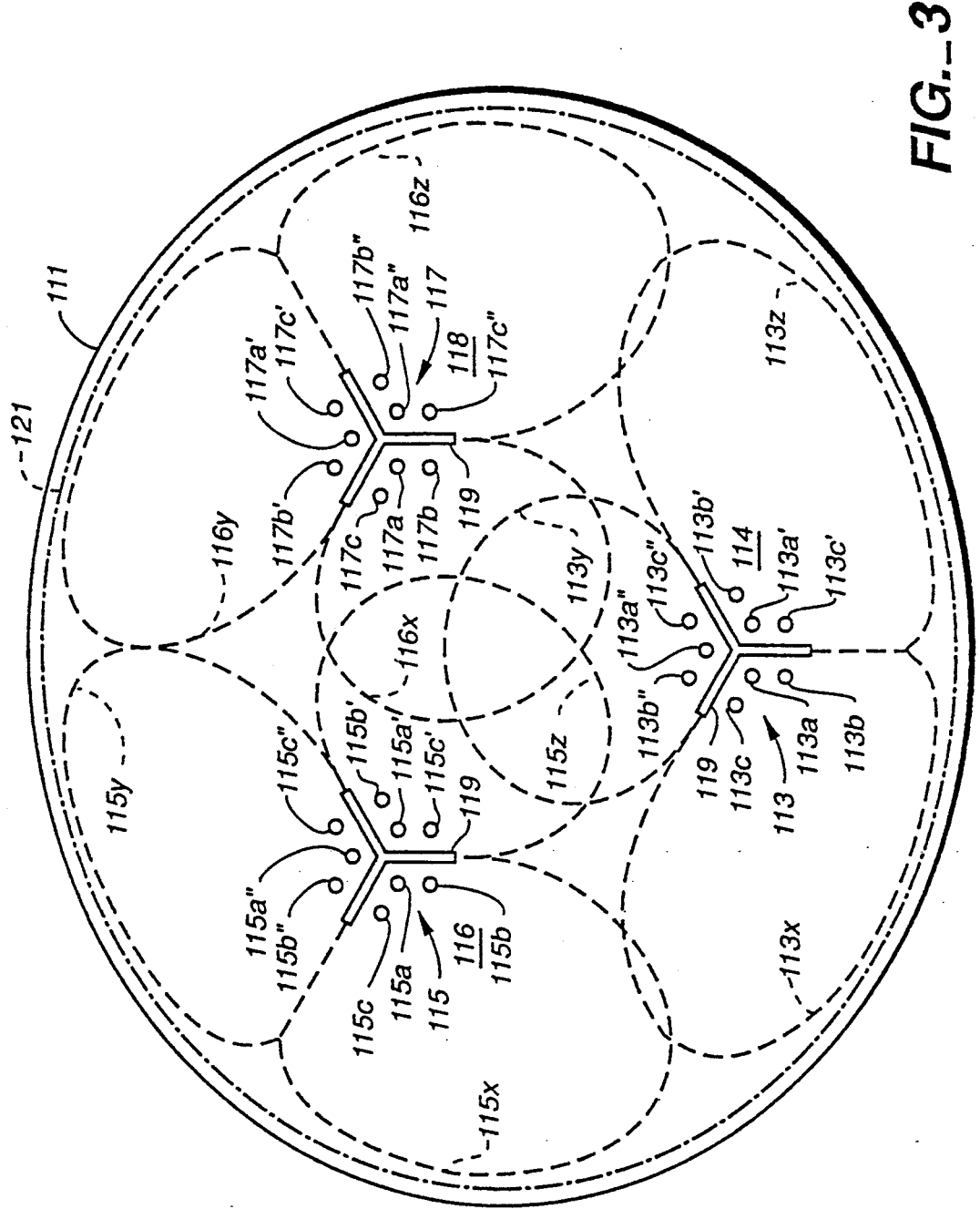
FIG._3

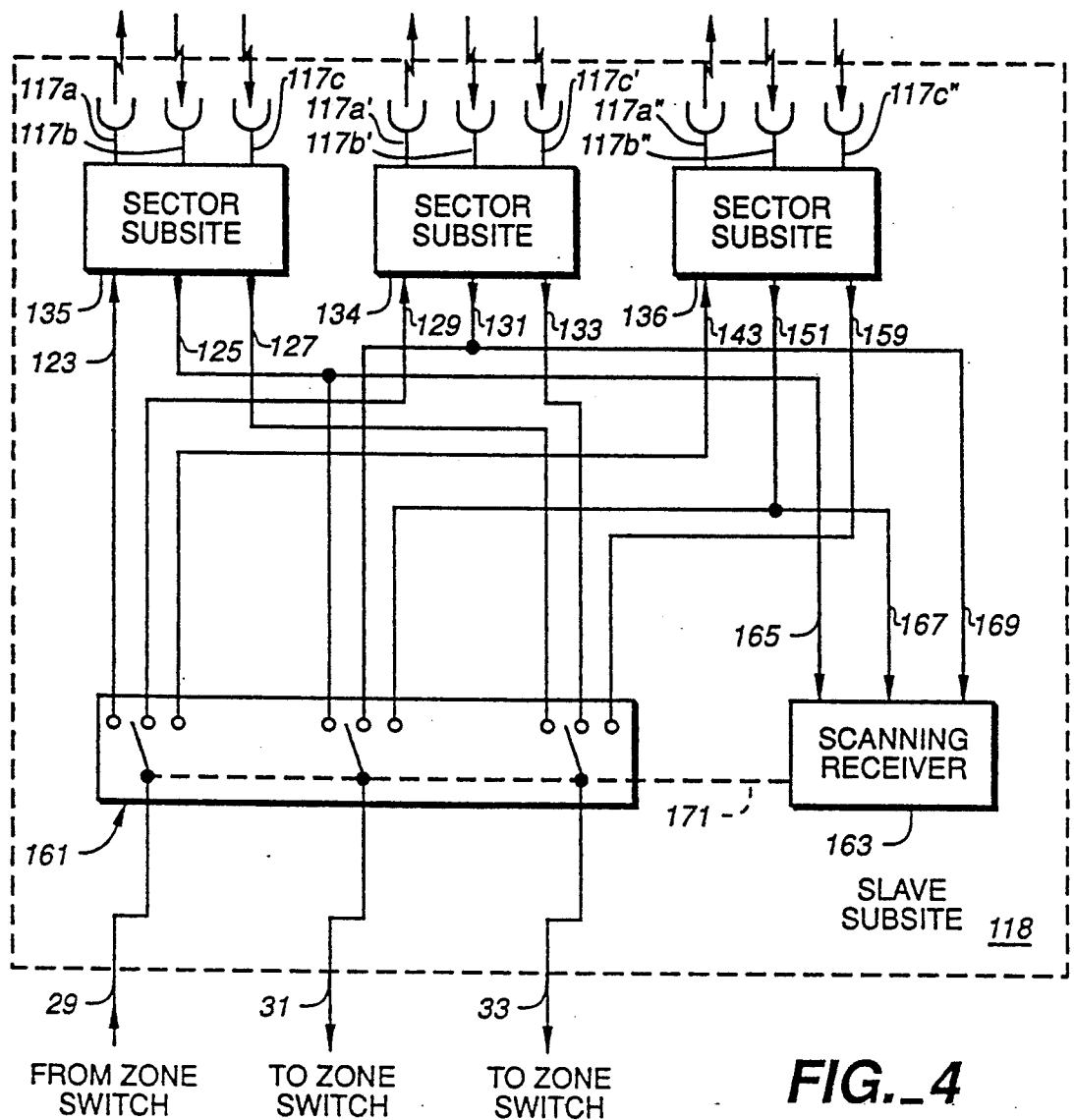
FIG._4
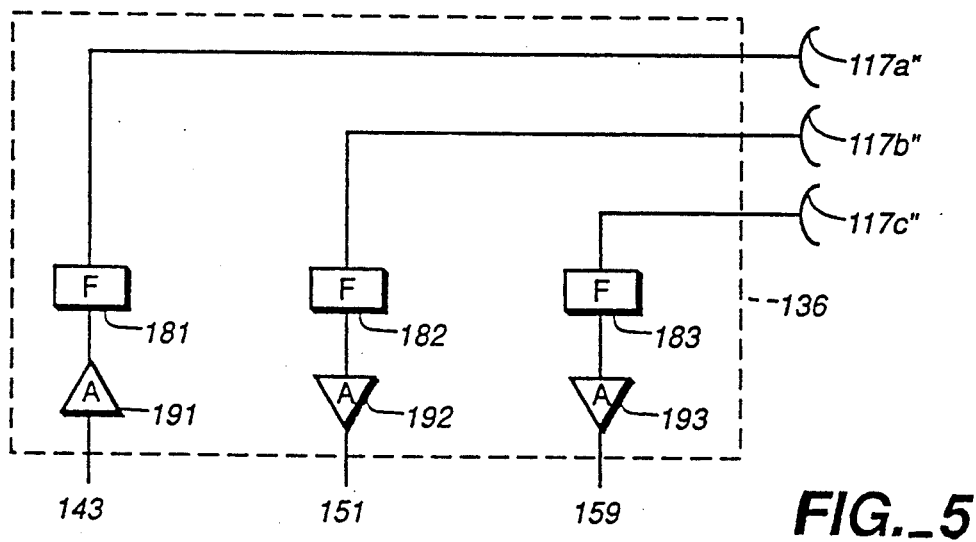
FIG._5

ZONED MICROCELL WITH SECTOR SCANNING FOR CELLULAR TELEPHONE SYSTEM

This application is a continuation of application Ser. No. 07/432,511 filed Nov. 7, 1989, abandoned, which is a continuation-in-part of application Ser. No. 07/307,070, filed Feb. 6, 1989, now U.S. Pat. No. 4,932,049.

FIELD OF THE INVENTION

This invention relates to cellular telephone systems wherein a plurality of contiguous cells, each having a different assigned set of transmission frequencies, are arranged with handoff means for maintaining continuous communication with mobile telephones moving from cell to cell. More particularly, the invention relates to a zoned microcell system with sector scanning for cellular telephone systems.

BACKGROUND OF THE INVENTION

In a typical cellular telephone system, as a mobile unit travels along a path that passes from one cell to another, a handoff occurs. The handoff action is controlled by a mobile telephone switching office (MTSO) which receives a handoff command or instruction. The handoff command is typically generated when the signal received from the mobile telephone falls below a preselected signal strength thus indicating that the mobile telephone is at the cell boundary.

Each cell in a cellular telephone system operates with a different assigned set of transmission frequencies. As a mobile telephone passes from one cell to another, the handoff signal instructs the cell which the mobile telephone is entering to begin transmitting at a frequency which is different from the frequency which was being transmitted by the cell which the mobile telephone is leaving. A similar procedure is followed when the mobile telephone passes into the next contiguous cell. Sets of assigned frequencies are different for adjacent cells, and such sets are not repeated except for cells that are far enough away from each other so that interference problems will not occur.

A mobile telephone unit typically contains a control unit, a transceiver, and an antenna system. Each cell site typically is provided with a control unit, radio cabinets, a power plant, data terminals, and antennas. The MTSO provides coordination for all the cell sites and contains suitable processing and switching means. The MTSO also interfaces with the telephone company zone offices for standard hardwired telephone systems. The communication links between the MTSO and the various cell sites are typically microwave, T carriers, or optical fiber, and carry both voice and control data between the cell sites and the MTSO.

When a user sitting in a car activates the receiver of the mobile unit, the receiver scans a plurality of set-up channels which are designated among the total channels assigned to the cell. Typically, there may be 21 set-up channels out of a total of 416 channels. (The remainder are communication channels.) The receiver then selects the strongest set-up channel and locks on for a certain time. Each site is assigned a different set-up channel. Accordingly, locking onto the strongest set-up channel usually means selecting the nearest cell site. This self-location scheme is used in the idle stage and is user-independent. It has a great advantage because it eliminates the load on the transmission at the cell site for locating the mobile unit. The disadvantage of the self-location scheme is that no location information of idle mobile units appears at each cell site. Therefore, when the call initiates from a standard non-mobile or land line to a mobile unit, the paging process is longer. Since a large percentage of calls originate at the mobile unit, the use of self-location schemes is justified. After a delay (for example, one minute) the self-location procedure is repeated.

To make a call from a mobile unit, the user places the called number into an originating register in the mobile unit, checks to see that the number is correct, and pushes a "send" button. A request for service is sent on a selected set-up channel obtained from a self-location scheme as described above. The cell site receives it, and in directional cell sites, selects the best directive antenna for the voice channel to use. At the same time the cell site sends a request to the MTSO via a high-speed data link. The MTSO selects an appropriate voice channel for the call, and the cell site acts on it through the best directive antenna to link the mobile unit. The MTSO also connects the wire-line party through the telephone company zone office.

When a land-line party dials a mobile unit number, the telephone company local office recognizes that the called number is mobile and forwards the call to the MTSO. The MTSO sends a paging message to certain cell sites based on the mobile unit number and a suitable search algorithm. Each cell site transmits the page on its own set-up channel. The mobile unit recognizes its own identification on a strong set-up channel, locks onto it, and responds to the cell site. The mobile unit also follows the instruction to tune to an assigned voice channel and initiate user alert.

When the mobile user turns off the transmitter, a particular signal (signaling tone) transmits to the cell site and both sides free the voice channel. The mobile unit resumes monitoring pages through the strongest set-up channel.

During a call, two parties are on a voice channel. When the mobile unit moves out of the coverage area of a particular cell site, the reception becomes weak. The present cell site requests a handoff via an appropriate signal, for example, a 100 ms burst on the voice channel. The system switches the call to a new frequency channel in a new cell site without either interrupting the call or alerting the user. The call continues as long as the user is talking. The user does not notice the handoff occurrences.

When call traffic in a particular area increases, increased capacity may be generated by reducing the area covered by a particular cell. For example, if a cell is split into four smaller cells, each with a radius of one-half the original, traffic is increased four fold. Naturally, the smaller the cell, the more handoffs required in a cellular telephone system for a given capacity.

Although in the proper circumstances reduced cell size is advantageous, certain problems can arise. Very often when cell size is reduced, for example to a radius of less than one mile, very irregular signal strength coverage will result. This may be caused by buildings and other structures, and can therefore become highly dependent upon the location of the mobile unit. Other problems arise in connection with signal interference. Although some cellular telephone systems, in an attempt to improve coverage, have employed several sets of frequencies in a small single cell, this prevents the reuse of the same frequencies or adjacent frequencies in the neighboring cells. The overall capacity of the system thereby decreases, since the number of available channels in a system is proportional to the inverse of the number of different frequency sets employed.

SUMMARY OF THE INVENTION

A zoned microcell system with sector scanning providing a more uniform signal coverage contour, lowered interference levels, and relatively simple and economical contruction is presented. The system includes a plurality of antenna sets, each set being suitably positioned within the periphery of a cell and having transmitting and receiving means directionally configured to limit propagation and reception of signals substantially to a zone within the boundaries of the cell.

Each of the plurality of antenna sets is divided into a plurality of antenna subsets. Each antenna subset is positioned and has transmitting and receiving means directionally configured to limit propagation and reception of signals substantially to a sector within the boundaries of the zone served by the associated antenna set. The strength of the signal received by each of the antenna subsets of each of the antenna sets at each frequency in the assigned set of transmission frequencies for the cell is monitored. The transmission service frequencies for the cell are, in this embodiment, confined to a selected antenna subset in the cell having the strongest received signal at each such frequency. This confines tranmission at such frequency to the sector associated with the selected antenna subset. Calls are switched from zone to zone within the cell at the same frequency so no handoff occurs.

DESCRIPTION OF THE DRAWING

FIG. 1 is a schematic diagram of a microcell configuration according to the system of U.S. Pat. No. 4,932,049.

FIG. 2 is a schematic block diagram of the electronics of the system of FIG. 1.

FIG. 3 shows schematically an embodiment of the present invention wherein a cell includes three separate antenna sets.

FIG. 4 is a block diagram of the electronics associated with one of the slave sub-sites in an embodiment of the present invention.

FIG. 5 is a schematic diagram of a signal processing section at a slave site.

DETAILED DESCRIPTION OF THE INVENTION

FIG. 1 is a schematic illustration of a cell 1 constructed in accordance with U.S. Pat. No. 4,932,049. The outer boundary of cell 1 is delineated by a circle 11 in solid line. Although shown as a circle, cells are often represented as hexagons in cell design schemes. In reality, however, due to the terrain and the presence of buildings and other structures, the actual boundary of cell 1 may have an irregular shape. In any case, solid line circle 11 is intended to represent the locus at which a mobile telephone unit passes from the influence of the illustrated cell into the influence of an adjacent cell.

Three separate antenna sets 13, 15, and 17 are positioned within the cell 11. Antenna sets 13, 15, and 17 are located at slave sub-sites 10, 16, and 18, respectively. Depending upon the particular conditions within the cell area, other numbers of antenna sets may be usefully employed, and it is to be understood that the use of three sets in FIG. 1 is for illustrative purposes only.

Each antenna set includes a transmitting antenna 13a, 15a, and 17a, respectively. Each antenna set also includes two receiving antennas 13b and 13c, 15b and 15c, and 17b and 17c, respectively. Duplication of the receiving antennas at each sub-site is for diversity use to reduce signal fading by combining the signals. In addition, antenna set 13 includes a control-channel transmitting antenna 13d for transmitting control signals, and duplicate control-channel receiving antennas 13e and 13f for receiving control signals, as will be explained below. Antenna sub-site 14 is called a master sub-site, whereas antenna sub-sites 10, 16, and 18 are called slave sub-sites. In the particular embodiment shown in FIG. 1, antenna set 13 is located at master sub-site 14, but it is understood that antenna set 13 may be located elsewhere within cell 1 as desired, depending upon the particular environment. The determination of the locations of sub-sites and the number of sub-sites in a cell can be based on Lee's coverage prediction model published in IEEE Transactions on Vehicular Technology, February, 1988.

Each antenna set has its own zone of major influence for transmitting and receiving signals. Thus, antenna set 13 at slave sub-site 10, co-located with master sub-site 14, has a zone indicated by a dotted line 13z. Similarly, antenna set 15 at slave sub-site 16 has a zone of influence designated by a dotted line 15z, and antenna set 17 at slave sub-site 18 has a zone of influence designated by a dotted line 17z. It may be seen from FIG. 1 that the zones overlap in certain areas. Directionality is provided to the antenna sets so that the zones of influence (i.e., the zones of propagation and reception of signals) are limited to be substantially within the boundaries of cell 1. Such directionality is provided by suitable means such as shown as a symbolic means 19 arranged at each antenna set or sub-site. Directionality means 19 can be a reflector for each individual antenna, or any other suitable arrangement to provide the desired directionality and coverage. The set of control-channel antennas 13d, 13e, and 13f, however, is configured to have a greater zone of influence, this being indicated by a dash-dot line 21, substantially coextensive with the limits of cell 1 delineated by circle 11.

FIG. 2 is a schematic block diagram of the electronics of the system of FIG. 1. The three slave sub-sites 10, 16, and 18 are each coupled to master sub-site 14 and are controlled therefrom. In the illustrated embodiment, slave sub-site 10 is connected to master sub-site 14 via three cables 43, 51, and 59. Slave sub-site 16 is connected to master sub-site 14 via three cables 23, 25, and 27. Slave sub-site 18 is connected to master sub-site 14 via cables 29, 31, and 33. Specifically, cable 43 is coupled to a converter 82, cable 29 is coupled to a converter 83, cable 23 is coupled to a converter 84, cable 51 is coupled to a converter 85, cable 31 is coupled to a converter 86, cable 25 is coupled to a converter 87, cable 59 is coupled to a converter 88, cable 33 is coupled to a converter 89, and cable 27 is coupled to a converter 90. Generally, cables 43, 23, and 29 carry transmitter antenna signals whereas cables 51, 59, 25, 27, 31, and 33, carry receiver antenna signals. The converters can up-convert or down-convert in frequency depending on the type of communication utilized between the slave sub-sites and the master sub-sites. The illustrated embodiment depicts the communication between the slave sub-sites and the master sub-site as being via cable. It will be apparent to those skilled in the art that such cables may include, for example, T1 carrier cables, optical fibers, or the like. The cables may also be replaced by microwave channels. For example, the converter-converter operation between the slave sub-site and the master sub-site can be done by (1) converting 800 MHz up to microwave and then converting down to 800 MHz, (2) converting 800 MHz to optical wave and then converting down to 800 MHz, and (3) converting 800 MHz down to 14 MHz baseband and then converting up to 800 MHz. If one of the slave sub-sites is co-located with the master sub-site, then the converters may be eliminated.

The slave sub-sites each contain a signal processing ensemble of components as shown at 35 for slave sub-site 10. It is understood that substantially identical signal processing ensembles are contained in slave sub-sites 16 and 18, although such ensembles are not shown in FIG. 2 for simplicity. Signal processing ensemble 35 includes a filter 37, an amplifier 39, and a converter 41 interposed between antenna 13a and cable output 43. Similarly, filter 45, amplifier 47, and converter 49 are interposed between antenna 13b and output cable 51, and filter 53, amplifier 55, and converter 57 are interposed between antenna 13c and output cable 59. The filters, amplifiers, and converters filter, enhance, and convert signals as desired and may be of any type suitable for the stated purpose.

At master sub-site 14, all of the cable connections 23, 25, 27, 29, 31, 33, 43, 51, and 59, after going through converters 82-90, terminate at a zone exchange or zone switch 61. Connections are also made from each of the output cables 25, 31, and 51 to a scanning receiver 63 via connections 65, 67, and 69, respectively.

Scanning receiver 63 at master sub-site 14 scans all of the sub-sites 10, 16, and 18, and all of the frequency channels allocated in the particular set assigned to that cell. It then chooses the strongest signal levels among all sub-sites for each frequency channel. A zone exchanger or zone switch 61 links the transmit signal for a respective frequency to the desired sub-site and terminates the old sub-site transmitter. The received signal is also switched to the same new sub-site.

Unlike the sub-site antennas, the control-channel signal antennas cover the entire cell and are used for setting up calls in the conventional manner known to those skilled in the art. Further elaboration on such procedure, as well as on cellular telephone systems in general, may be found in the book *Mobile Cellular Telecommunications Systems*, by William C. Y. Lee, McGraw-Hill, New York, St. Louis, San Francisco, 1989.

Scanning receiver 63 provides an output control signal via a suitable connector 71 to the zone switch 61. Zone switch 61 may be of any suitable construction to provide switching between the respective sub-sites, which switching depends upon the strength of the signal being received at a sub-site as determined by scanning receiver 63. Master sub-site 14 further includes carrier frequency modules 73, 75, and 77. Module 73 is assigned to the transmitters and modules 75 and 77 are assigned to the receivers. Each module provides for the assigned set of carrier frequencies for the particular cell. For example, a portion of the 395 voice channels and one of the 21 control channels may be assigned to an individual cell.

The signals from the antennas received at modules 75 and 77 are combined and conducted to a controller 79. Controller 79 also provides signals to transmitter module 73. Controller 79 also determines which of the cables is connected to provide the received voice signals to the MTSO. Controller 79 is connected via suitable connections to and from the MTSO. In addition, controller 79 is connected to a transceiver 81 which transmits and receives signals on the three control antennas 13d, 13e, and 13f.

Controller 79 measures the signal strength of a channel requested by the MTSO. If the initial call is in this particular cell, or if the call is handed off to this particular cell through controller 79, the controller initiates transmission at a particular frequency assigned by the MTSO to that call. The frequency assigned is the one which has the lowest noise level as determined by the controller. If, during the call, the signal strength received from all the antenna sets is below a preselected level, the controller initiates a handoff procedure from the MTSO.

In operation, a mobile unit operating on an assigned frequency $f_1$ in the cell will typically be moving within the cell. All sub-sites within the cell will receive signal levels, but not necessarily the voice signals from the mobile unit. Only the sub-site at which the received signal level is the strongest will transmit and receive signals to the mobile unit and set up a call. When the mobile unit moves so that another sub-site receives the strongest signal, the system turns off the transmitter at the weaker sub-site and turns on the transmitter at the sub-site where the strongest signal is being received. The two-diversity receiver antennas are also switched to the proper sub-site to receive the call. The frequency, however, does not change and remains at $f_1$. Thus no handoff has occurred in the traditional sense and the MTSO is not involved. In this way, no additional handoff load is added to the MTSO switching equipment. If the signal strength from the mobile unit received by all the sub-sites is below a predetermined level, a handoff may be requested from the master sub-site to the MTSO.

The advantages accruing from the cell design of FIGS. 1 and 2 include a significant improvement in uniformity of coverage as opposed to cells in which only a single antenna site in each cell is employed. This becomes particularly advantageous in connection with a small cell, i.e., a cell having a radius of less than one mile. Since, by reducing the effective radiation area covered by each sub-site, the effective radiation radius for each frequency is reduced, a consequent lowering of the interference level also results. All of this accomplished without the necessity of handoffs within the cell itself. The frequency at which transmission occurs does not change in a cell, although the active sub-site in a cell switches from one to another according to signal level. This is accomplished in a relatively simple and economical way, and enables the size of a cell to be reduced to as low as 500 to 1000 feet in radius.

FIG. 3 shows schematically an embodiment of the present invention wherein a cell, as in the case illustrated by FIG. 1, includes three separate antenna sets designated as 113, 115, and 117. The outer boundary of the cell is defined by a circle 111 (solid line). As mentioned in connection with FIG. 1, the cell, in reality, may be irregular in shape. The solid line 111 represents the boundary at which a mobile telephone unit passes from the influence of the illustrated cell to the influence of an adjacent cell.

In the present invention, antenna set 113 is located at a master sub-site 114, whereas the antenna sets 115 and 117 are located at sub-sites 116 and 118, respectively. Master sub-site 114 can be co-located with any one of the slave sub-sites as desired. It is also understood that other numbers of antenna sets may be usefully employed and that the three sets shown in FIG. 3 are illustrative only.

Unlike the system of FIG. 1 wherein each antenna set includes a single transmitting antenna and two receiving antennas, antenna sets 113, 115, and 117 each include a plurality of sub-sets of antennas which, in the illustrated embodiment, constitute three sub-sets at each sub-site. Each antenna sub-set includes a transmitting antenna designated respectively as 113a, 113a', 113a", 115a, 115a', 115a", 117a, 117a', and 117a", respectively. Each antenna set also includes two receiving antennas, designated as 113b, 113b', 113b", 113c, 113c', 113c", 115b, 115b', 115b", 115c, 115c', 115c", 117b, 117b', 117b", and 117c, 117c', 117c", respectively. Duplication of the receiving antennas at each sub-set is for diversity use to reduce signal fading by combining the signals. The determination of the locations of sub-sites, the number of sub-sites in a cell, and the number of antenna sub-sets at each sub-site can be based on the Lee coverage prediction model published in IEEE Transactions on Vehicular Technology, February, 1988.

Cell 111 also includes an antenna set (not shown) for transmitting and receiving control signals as explained above in connection with antenna set 13 of FIG. 1 for transmitting and receiving signals to a suitable controller (not shown). As was the case in connection with FIG. 1, such control-channel antennas are configured to have a zone of influence substantially coextensive with the limits of cell 111 as indicated by the dash-dot line 121.

As was the case with FIG. 1, each antenna set has its own zone of major influence for transmitting and receiving signals. Unlike FIG. 1, however, each antenna set in the embodiment of FIG. 3 has its zone of major influence sub-divided into a plurality of substantially separate sectors. Thus, the zone of influence related to sub-site 114 is comprised of three sectors 113x, 113y, and 113z. Sector 113x is serviced by the antenna sub-set 113a, 113b, and 113c. Sector 113y is serviced by the antenna sub-set 113a", 113b", and 113c". Sector 113z is serviced by the antenna sub-set 113a', 113b', and 113c'. The zone of influence of the other sub-sites 116 and 118 in FIG. 3 are similarly constituted by sectors given appropriate designations consistent with those in connection with sub-site 114.

It may be seen from FIG. 3 that the antenna sub-sites are positioned displaced inwardly from the periphery of cell 111 and that the sectors overlap in certain areas. Directionality is provided to the antenna sub-set so that the sectors associated with the sub-sets, i.e., the zones of propagation and reception of signals, are limited to be substantially within the boundaries of the zone serviced by that particular sub-site. Moreover, as was the case shown in FIG. 1, the sectors are also limited to be substantially within the boundaries of cell 111. Directionality is provided by suitable means such as shown by a symbolic means 119 arranged at each antenna set or sub-site. As illustrated in FIG. 3, directionality means 119 constitutes reflectors at each sub-site which divide the respective sectors at approximately 120° segments. However, it is to be understood that any other suitable arrangement to provide a desired directionality and coverage, including omni-directional antennas, may be employed within the spirit and scope of the invention. Of course, the strength of the signal transmitted at each antenna sub-site may also be appropriately adjusted to provide the desired sector coverage.

FIG. 4 is a block diagram of the electronics associated with one of the slave sub-sites 117 of FIG. 3. It is to be understood that slave sub-site 118 illustrated in FIG. 4 is connected in the system of the invention substantially as shown in FIG. 2 in connection with slave sub-site 18. To clarify this, leads 29, 31, and 33 have been designated in FIG. 4. Generally, cable 29 carries transmitter antenna signals whereas cables 31 and 33 carry receiver antenna signals. It is to be understood that, in the case of a master sub-site, in addition to the elements illustrated in FIG. 4, elements as illustrated and described in connection with FIG. 2 would also be incorporated.

The three sub-sets of the antenna set are designated with the identical nomenclature of FIG. 3. Each of the antenna sub-sets is connected to a respective one of a plurality of sector sub-sites 134, 135, and 136. Each of the sector sub-sites contains a signal processing section substantially similar to the signal processing section 35 illustrated in FIG. 2 but without the converters. This is shown in FIG. 5 for exemplary slave sub-site 136. Filter 181 and amplifier 191 are coupled between antenna 117a" and cable connection 143, filter 182 and amplifier 192 are coupled between antenna 117b" and cable connection 151, and filter 183 and amplifier 193 are coupled between antenna 117c" and cable connection 159. Referring back to FIG. 4, suitable cable connections 123, 125, 127, 129, 131, 133, 143, 151, and 159, provide connection between the various sector sub-sites and a three 3-port sector switch 161. In addition, connection is made for receiver signals via cables 125, 131, and 151, to a scanning receiver 163 via connections 165, 167, and 169, respectively. Scanning receiver 163 provides an output control signal, via a suitable connector 171, to the sector switch 161. The sector switch 161 may be of any suitable construction to provide switching between the respective sector sub-sites 134, 135, and 136, which switching depends upon the strength of the signal being received at a respective sector sub-site as determined by scanning receiver 163.

The present invention thus provides two levels of discrimination for the strength of the signals at each of the frequencies within the assigned set for the cell. Signal strength discrimination occurs at each antenna sub-site and determines which sub-set of antennas at that sub-site will be operational. At the same time, there is discrimination between sub-sites to determine which sub-site will be operational. Thus, only that sector within the cell at which the strongest signal is being received will transmit and receive signals to the mobile unit and set up a call. Once the mobile unit moves such that the received signal strength at a particular sector other than the one that is currently transmitting becomes the strongest, the system operates to turn off the transmitter associated with the weaker sector and turn on the transmitter associated with the sector at which the strongest signal level is being received. The two diversity receiver antennas associated with that particular sector are also switched to receive the call. In some circumstances, the receivers at each sector need not be turned off. The frequency, however, does not change and remains the same throughout the cell for a given mobile unit. Thus, no handoff occurs in the traditional sense and the MTSO is not involved. No additional handoff load is added to the MTSO switching equipment as a result of the foregoing described sub-division of the cells.

The advantages accruing from the division of cells into sub-site zones and then subset sectors in accordance with the present invention include a significant improvement in the uniformity of coverage over systems utilizing only a single antenna site in each cell. This becomes particularly advantageous in connection with a small cell, i.e., a cell having a radius of less than one mile. Since, by reducing the effective radiation area covered by each sub-site over each zone and sector, the effective radiation radius for each frequency is reduced, a consequent lowering of the interference level also results. All of this is accomplished without the necessity of handoffs within the cell. The frequency at which transmission occurs does not change in a cell, although the active sub-site in a cell switches from one to another according to signal level. This is achieved in a relatively simple and economical way, and enables the size of a cell to be reduced to as little as 500 to 1000 feet in radius.

Various modifications of the invention, in addition to those shown and described herein, will become apparent to those skilled in the art from the foregoing description and accompanying drawings. Such modifications are intended to fall within the scope of the following claims.

What is claimed is:

1. In a cellular telephone system wherein a plurality of contiguous cells, each having an assigned set of communication channels, are arranged with handoff means for maintaining continuous communication with mobile telephones moving from cell to cell,
    a cell having a plurality of antenna sets, each set being positioned and having transmitting and receiving means directionally configured to limit propagation and reception of signals substantially to a zone within the boundaries of said cell,
    each of said plurality of antenna sets being divided into a plurality of sub-sets, each sub-set being positioned and having transmitting and receiving means directionally configured to limit propagation and reception of signals substantially to a sector within the boundaries of the zone served by the associated antenna set,
    control means including means for monitoring the strength of the signal associated with each one of the communication channels assigned to said cell and received by each of said sub-sets of each of said antenna sets,
    and means for switching to a selected antenna sub-set in said cell having the strongest received signal associated with a selected one of the communication channels such that communication using said selected communication channel is maintained and is limited to the sector associated with the selected antenna sub-set.

2. A cell according to claim 1 wherein said control means includes means for setting up calls comprising a control signal antenna located at one of said antenna sets, said control signal antenna being configured to limit propagation and reception of signals to and from the others of said antenna sets in said cell and to and from a mobile telephone in said cell.

3. A cell according to claim 1 wherein each of said antenna sub-sets comprises a transmitting antenna and two receiving antennas.

4. A cell according to claim 1 wherein each of said plurality of antenna sets is positioned at a location substantially displaced from the boundary of said cell.

5. A cell according to claim 1 wherein said monitoring means includes frequency scanning receiver means for determining the strength of the signal associated with each one of the communication channels assigned to said cell at each of said antenna subsets.

6. A cell according to claim 5 wherein said control means include means for generating a handoff signal when the signal strength at all of said antenna sets determined by said monitoring means falls below a predetermined level.

7. A cellular telephone system including a plurality of contiguous cells, each of said cells having an assigned sets of communication channels, said cells being arranged with handoff means for maintaining continuous communication with mobile telephones moving from cell to cell, at least one of said cells comprising:
    a plurality of antenna sets, each set being positioned and having transmitting and receiving means directionally configured to limit propagation and reception of signals substantially to a zone within the boundaries of said cell,
    each of said plurality of antenna sets being divided into a plurality of sub-sets, each sub-set being positioned and having transmitting and receiving means directionally configured to limit propagation and reception of signals substantially to a sector within the boundaries of the zone served by the associated antenna set,
    control means including means for monitoring the strength of the signal associated with each one of the communication channels assigned to said cell and received by each of said sub-sets of each of said antenna sets,
    and means for switching to a selected antenna sub-set in said cell having the strongest received signal associated with a selected one of the communication channels such that communication using said selected communication channel is maintained and is limited to the sector associated with the selected antenna sub-set.

8. A system according to claim 7 wherein said control means includes means for setting up calls comprising a control signal antenna located at one of said antenna sets, said control signal antenna being configured to limit propagation and reception of signals to and from the others of said antenna sets in said one of said cells and to and from a mobile telephone in said one of said cells.

9. A system according to claim 7 wherein each of said antenna sub-sets comprises a transmitting antenna and two receiving antennas.

10. A system according to claim 7 wherein each of said plurality of antenna sets is positioned at a location substantially displaced from the boundary of said one of said cells.

11. A system according to claim 7 wherein said monitoring means include frequency scanning receiver means for determining the strength of the signal associated with each one of the communication channels assigned to said one of said cells at each of said antenna sub-sets.

12. A system according to claim 11 wherein said control means include means for generating a handoff signal when the signal strength at all of said antenna sets determined by said monitoring means falls below a predetermined level.

13. A system according to claim 11 including a mobile telephone switching office, wherein said control means inform said switching office of the one of said communication channels which is unused which said scanning receiver means determines has the lowest interference level.

* * * * *